(12) United States Patent
Anderson

(10) Patent No.: US 11,557,151 B2
(45) Date of Patent: Jan. 17, 2023

(54) OBJECT IDENTIFICATION ON A MOBILE WORK MACHINE

(71) Applicant: Deere & Company, Moline, IL (US)

(72) Inventor: Noel W. Anderson, Fargo, ND (US)

(73) Assignee: Deere & Company, Moline, IL (US)

(*) Notice: Subject to any disclaimer, the term of this patent is extended or adjusted under 35 U.S.C. 154(b) by 147 days.

(21) Appl. No.: 16/662,226

(22) Filed: Oct. 24, 2019

(65) Prior Publication Data

US 2021/0124913 A1 Apr. 29, 2021

(51) Int. Cl.
*G06V 20/58* (2022.01)
*G06V 40/20* (2022.01)
(Continued)

(52) U.S. Cl.
CPC ........... *G06V 40/20* (2022.01); *G06K 9/6267* (2013.01); *G06T 7/20* (2013.01); *G06V 20/58* (2022.01); *G06T 2207/30261* (2013.01)

(58) Field of Classification Search
CPC ........... G06K 9/00335; G06K 9/00805; G06K 9/6267; G06K 9/6284; G06T 2207/30261;
(Continued)

(56) References Cited

U.S. PATENT DOCUMENTS 6,678,413 B1  1/2004  Liang et al.
8,885,929 B2  11/2014  Ni et al.
(Continued)

FOREIGN PATENT DOCUMENTS

DE  102017204404 B3  6/2018
DE  102019111249 A1  11/2019
WO      19007718 A1   1/2019

OTHER PUBLICATIONS

Aditiba Raol et al., "On Board Animal Detection System Using Image Processing", International Journal for Scientific Research & Development, vol. 6, Issue 03, 2018 | ISSN (online) 2321-06135, pp. 365-363.

(Continued)

*Primary Examiner* — Marcos L Torres
(74) *Attorney, Agent, or Firm* — Joseph R. Kelly; Kelly, Holt & Christenson PLLC

(57) ABSTRACT

An object identification system on a mobile work machine receives an object detection sensor signal from an object detection sensor, along with an environmental sensor signal from an environmental sensor. An object identification system generates a first object identification based on the object detection sensor signal and the environmental sensor signal. Object behavior is analyzed to determine whether the object behavior is consistent with the object identification, given the environment. If an anomaly is detected, meaning that the object behavior is not consistent with the object identification, given the environment, then a secondary object identification system is invoked to perform another object identification based on the object detection sensor signal and the environmental sensor signal. A control signal generator can generate control signals to control a controllable subsystem of the mobile work machine based on the object identification or the secondary object identification.

21 Claims, 9 Drawing Sheets

(51) Int. Cl.
*G06T 7/20* (2017.01)
*G06K 9/62* (2022.01)

(58) Field of Classification Search
CPC .......... G06T 7/20; G06V 40/20; G06V 20/58; G06V 10/764; G06V 10/82
See application file for complete search history.

(56) References Cited

U.S. PATENT DOCUMENTS

| | | | |
|---|---|---|---|
| 8,948,501 B1* | 2/2015 | Kim | G06K 9/00711 382/159 |
| 9,600,768 B1 | 3/2017 | Ferguson | |
| 10,059,334 B1 | 8/2018 | Zhu et al. | |
| 2003/0058111 A1 | 3/2003 | Lee et al. | |
| 2008/0031491 A1 | 2/2008 | Mia et al. | |
| 2010/0208063 A1 | 8/2010 | Lee et al. | |
| 2011/0050875 A1 | 3/2011 | Nagata et al. | |
| 2011/0128374 A1 | 6/2011 | Shellshear et al. | |
| 2017/0132334 A1* | 5/2017 | Levinson | G06F 30/20 |
| 2018/0373963 A1* | 12/2018 | Lo | G06K 9/00818 |
| 2019/0137622 A1* | 5/2019 | Lopez-Hinojosa | G01S 13/865 |
| 2020/0098394 A1 | 3/2020 | Levinson et al. | |

OTHER PUBLICATIONS

Object Detection and Image Classification with YOLO, KNIME Fall Summit 2019, Nov. 5-8 in Austin TX, https://www.kdnuggets.com/2018/09/object-detection-image-classification-yolo-html., 9 pages.

Kristin Hohenadel, "The EYE, Britian Has a Poo-Powered Bus. But Does Its Design Campaign Stink?", Apr. 23, 2015, 9 pages. https://slate.com/human-interest/2015/04/genco-bio-bus-is-a-human-waste-powered-bus . . . .

https://www.researchgate.net/figure/The-Google-Inception-v3-classifier-fails-to-recognize-familiar-objects-in-strange-poses_fig6_333039347 2 pages.

https://www.alamy.com/stock-photo/overloaded-bicycle.html, 24 pages.

https://www.youtube.com/watch?v=jglwtgSHISI, 1 page.

German Search Report issued in application No. DE102020211939.2 dated Jun. 10, 2021 (16 pages).

* cited by examiner

OBJECT IDENTIFICATION ON A MOBILE WORK MACHINE

FIELD OF THE DESCRIPTION

The present description relates to object identification. More specifically, the present description relates to object identification on a mobile work machine.

BACKGROUND

There are a wide variety of different types of mobile work machines. Such machines can include agricultural machines, construction machines, forestry machines, turf management machines, among others.

These types of mobile work machines often work in environments where objects can be encountered. For instance, when traveling through a construction site, through an agricultural site, or through a wooded site, it is not uncommon for a mobile work machine to encounter a large variety of different types of objects. Some of those objects pose no threat to the operation being performed, or to any other entities (human beings, animals, etc.) in the proximity of the work machine. However, some objects, when encountered, can be problematic.

Thus, some current systems have attempted to perform object identification so that objects encountered by a mobile work machine can be identified. In such systems, once the object is identified, the identification of the object can be surfaced for the equipment operator so that appropriate actions can be taken.

The discussion above is merely provided for general background information and is not intended to be used as an aid in determining the scope of the claimed subject matter.

SUMMARY

An object identification system on a mobile work machine receives an object detection sensor signal from an object detection sensor, along with an environmental sensor signal from an environmental sensor. An object identification system generates a first object identification based on the object detection sensor signal and the environmental sensor signal. Object behavior is analyzed to determine whether the object behavior is consistent with the object identification, given the environment. If an anomaly is detected, meaning that the object behavior is not consistent with the object identification, given the environment, then a secondary object identification system is invoked to perform another object identification based on the object detection sensor signal and the environmental sensor signal. A control signal generator can generate control signals to control a controllable subsystem of the mobile work machine based on the object identification or the secondary object identification.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
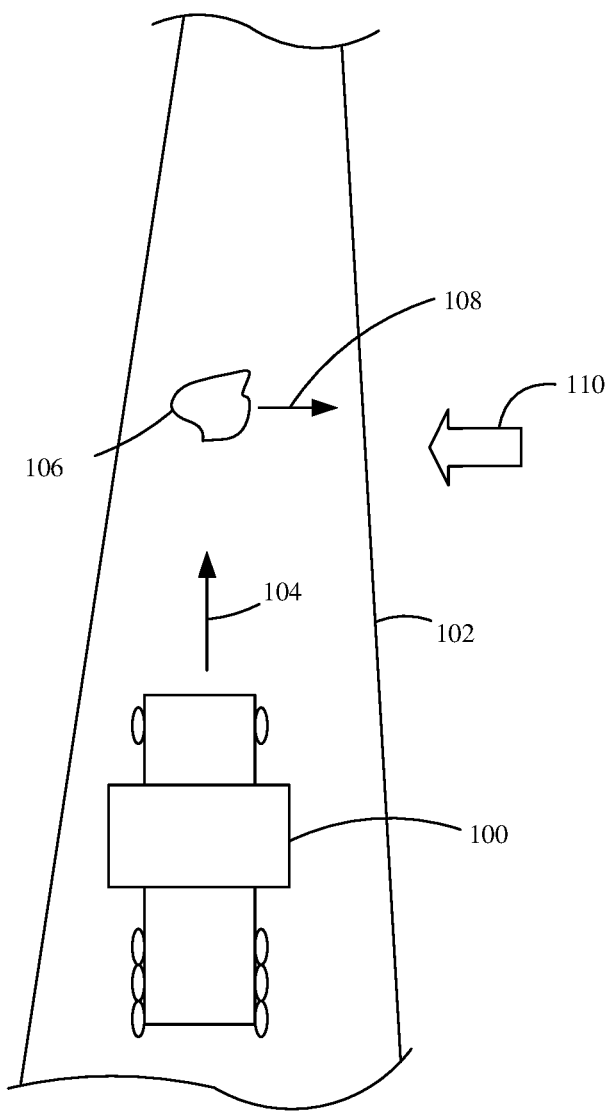
FIG. 1 is a pictorial illustration showing a mobile work machine encountering an object.

As discussed above, it is not uncommon for mobile work machines to encounter objects. Thus, some systems have attempted to perform object identification on a mobile work machine to identify objects that are encountered. This can be very difficult for a number of reasons, such as confusion that occurs when multiple objects are present in close proximity to one another. By way of example, in one instance, an object identification system may identify an object as a plastic bag. This would ordinarily present no difficulties for a mobile work machine which encountered it. However, in actuality, the object may be a human being pushing a bicycle, with plastic bags hanging from the handlebars. Should a mobile work machine contact the object, in that case, the results could be very problematic.

In another example, assume that an animal, such as an armadillo, is on the center of a roadway where a mobile work machine is traveling. An object identification system may easily identify the armadillo as a relatively small obstacle (e.g., a mound of dirt, etc.) in the roadway and thus assume that the mobile work machine can easily drive over it. In actuality, however, it has been found that armadillos have a reflexive response when a vehicle passes over them. They jump upwardly, contacting, and often damaging, the underside of the vehicle.

Another problem is mis-identifying objects based on recognition criteria. For example, if an object identification system has an optical recognition type of object recognition, it may identify an object as a human being. In actuality, however, the object may be a photograph of a human being on the side of a bus or other larger vehicle.

These are just some examples of instances where an object identification system can easily misidentify an object. The misidentification may have relatively serious consequences, depending upon how the mobile work machine is controlled, given the erroneous object identification.

Thus, the present description proceeds with respect to an object identification system that receives an object detection sensor signal from a sensor that detects an object. It also receives an environmental sensor signal indicative of a characteristic of the environment. An object identification classifier identifies the object based upon the object detection sensor signal. An object behavior analysis system analyzes the behavior of the object to determine whether it is consistent with the object identification, given its environment, as indicated by the environment sensor signal. An object identification anomaly detection system detects whether the object identification is an anomaly, given its behavior relative to the environmental conditions. If so, it generates an action signal to take some action based upon the identified anomaly. For instance, it can control a secondary object identification system to perform a different type of object identification. It can provide an output to a control signal generator which generates control signals to control the mobile work machine. It can provide an output signal to control a communication system to communicate with a remote user, or to control a user interface system to surface an alert to a vehicle operator. These are just examples.

An example may be helpful. Assume that the initial object identification system identifies the object as a plastic bag. However, assume also that the object behavior analysis system determines that the detected object (e.g., the plastic bag) is moving against the wind (as indicated by the environmental sensor signal). This would indicate that the original object identification (e.g., a plastic bag) is anomalous because the plastic bag is not behaving consistently, given the environmental conditions. Similarly, given the example above in which a person was recognized, the behavior analysis system may identify that the person was moving 40 miles per hour. This would indicate an anomalous detection, because of the speed of movement. In both cases, the secondary object identification system can be invoked to properly identify the object (as a person pushing a bicycle with a plastic bag on the handle bars and as a picture of a person on the side of another vehicle). Again, these are examples only.

FIG. 1 is a pictorial illustration showing a mobile work machine (such as a dump truck) 100 traveling along a pathway, or roadway 102, in the direction indicated by arrow 104. FIG. 1 also shows that an object 106 is in the travel path of machine 100 and is moving in the direction indicated by arrow 108. FIG. 1 further shows that, in the environment, the wind is blowing in the direction indicated by arrow 110. Thus, as will be described below, an object identification system on machine 100 can detect the object 106 and the wind direction (and speed) indicated by arrow 110. It can make an initial object identification of object 106 and determine whether it is consistent with the environmental characteristics (e.g., the wind direction). If not, it can detect an anomaly and take various actions. For instance, if the object detection system on machine 100 identifies object 106 as a plastic bag, then the object behavior analysis system will determine that it is moving in the direction indicated by arrow 108. An object identification anomaly detection system will determine that this is anomalous, because the "plastic bag" 106 is actually moving in a direction that is opposite the wind direction 110. Therefore, a secondary object identification system can be invoked, the operator of machine 100 can be alerted, the speed of machine 100 can be reduced, or a wide variety of other actions can be taken.

Figure 2:
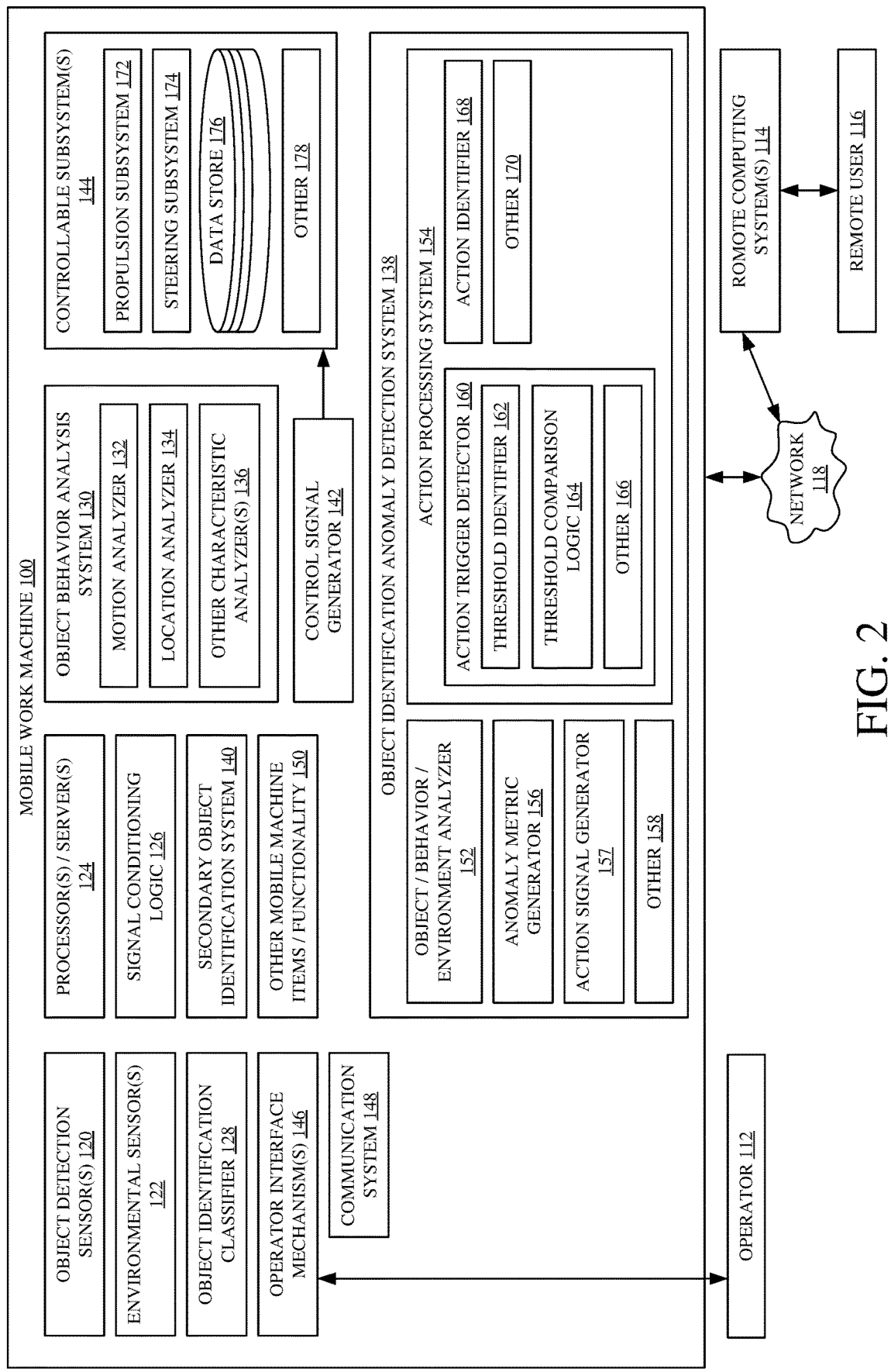
FIG. 2 is a block diagram showing one example of a mobile work machine, in more detail.

FIG. 2 is a block diagram showing one example of mobile work machine 100, in more detail. FIG. 2 shows that operator 112 can interact with mobile work machine 100. Similarly, FIG. 2 shows that mobile work machine 100 can communicate with one or more remote computing systems 114 (which may have remote users 116) over network 118. Therefore, network 118 can be a wide area network, a local area network, a near field communication network, a cellular communication network, or any of a wide variety of other networks or combinations of networks.

FIG. 2 shows that, in one example, mobile work machine 100 can have one or more object detection sensors 120, environmental sensors 122, one or more processors or servers 124, signal conditioning logic 126, object identification classifier 128, object behavior analysis system 130 (which can include motion analyzer 132, location analyzer 134, and a wide variety of other characteristic analyzers 136), object identification anomaly detection system 138, secondary object identification system 140, control signal generator 142, one or more controllable subsystems 144, operator interface mechanisms 146, communication system 148, and it can include a wide variety of other mobile machine items and/or functionality 150.

Object identification anomaly detection system 138 can include object/behavior/environment analyzer 152, action processing system 154, anomaly metric generator 156, action signal generator 157, and it can include other items 158. Action processing system 154, itself, can include action trigger detector 160, which itself can include threshold identifier 162, threshold comparison logic 164, and other items 166. Action processing system 154 can also include action identifier 168, and other items 170. Controllable subsystems 144 can include such things as a propulsion subsystem 172, a steering subsystem 174, data store 176, and a wide variety of other controllable subsystems 178.

Before describing the overall operation of mobile machine 100, a brief description of some of items in mobile machine 100, and their operation, will first be provided. Object detection sensors 120 can be deployed on mobile work machine 100, and can include any of a wide variety of different types of sensors. For instance, they can include optical sensors, such as a camera, stereo cameras, or structured light sensors. They can include other sensors such as LIDAR, radar, ultrasonic sensors, etc.

Environmental sensors 122 can also include a wide variety of different types of sensors. For instance, they can include an air temperature sensor, a soil temperature sensor, a wind speed sensor, a wind direction sensor, a precipitation sensor, a position sensor (which provides a position or location in local or global coordinates, and it may also provide an orientation, an altitude, etc.). Sensors 120 and 122 generate sensor signals indicative of the variables that they sense.

Signal conditioning logic 126 can receive the sensor signals and perform signal conditioning on them. For instance, signal conditioning logic 126 can perform amplification, filtering, normalization, linearization, and any of a wide variety of different types of signal conditioning.

Operator interface mechanisms 146 can include a wide variety of different types of mechanisms that operator 112 can interact with in order to control and manipulate mobile work machine 100. Therefore, mechanisms 146 can include a steering wheel, joysticks, pedals, levers, linkages, buttons, etc. In addition, where speech recognition and speech synthesis are provided, mechanisms 146 can include a microphone and speaker. Mechanisms 146 can include a wide variety of visual mechanisms, such as a display screen which may be touch sensitive, in which case it can process touch gestures. The display screen may display actuatable items that can be actuated by operator 112 using a point and click device, or other mechanisms. The operator interface mechanisms 146 can also include such things as other visual items (e.g., lights, or other visual items), audio mechanisms and/or haptic mechanisms, among others.

Communication system 148 is illustratively configured to facilitate communication among the various items on mobile work machine 100 (e.g., over a CAN bus, a wireless link, etc.) and also to facilitate communication between items on mobile work machine 100 and remote computing system 114 over network 118. Therefore, communication system 148 may vary, based upon the different types of communication it is to facilitate.

Object identification classifier 128 can be, for instance, a neural network, a rules-based system, an image processing system, or any of a wide variety of other classifiers that can receive the conditioned sensor signals (or values derived from them) and generate an object identification output indicative of an object identification corresponding to those inputs.

Object behavior analysis system 130 can analyze object detection sensor signals from sensor 120 to identify characteristics of the behavior of the object that has been identified. For instance, motion analyzer 132 can obtain a sequence of images or other sensor signals and analyze the location of the object in each of those images in order to identify a motion vector corresponding to the object. By knowing the time lapse between the objects, motion analyzer 132 can also identify the speed of the object in addition to the direction that it is moving.

Location analyzer 134 can analyze the sensor signals to also identify a variety of different characteristics of the object. For instance, it can identify whether the object is a terrestrial object (residing on the ground), whether it is air born, and, in conjunction with the output from motion analyzer 132, it can identify whether the object is falling, floating, being driven in a particular direction (e.g., against the wind), etc. It can also determine whether the object is in close proximity to machine 100, or otherwise.

The behavioral characteristics and/or environmental data can be referred to as "object anomaly data." Object identification anomaly detection system 138 receives the object identification from classifier 128, the environment data from environmental sensors 122 and/or the behavioral characteristics of the object output by object behavior analysis system 130, (e.g., the object identification and the object anomaly data). It then generates an output indicative of some measure of whether the object identification is anomalous (e.g., erroneous) by determining whether the object anomaly data is consistent with the object identification (e.g., whether the object identification is consistent with the behavioral characteristics, given the environment indicated by the environmental sensor signals generated by environmental sensors 122). Object/behavior/environment analyzer 152 analyzes the behavior of the object, given its identification, and given its environment, to determine whether the object's behavior is consistent with what it has been identified as, and its environment. Anomaly metric generator 156 generates a metric indicative of that consistency (and thus indicative of whether the object identification is anomalous).

For instance, if the object identification classifier 128 has identified the object as a plastic bag, but object behavior analysis system 130 has determined that the object is moving against the wind, then analyzer 152 will generate an output indicating that this is inconsistent. Anomaly metric generator 156 will generate an anomaly metric valuing the level of that inconsistency. It may, for instance, output a likelihood metric indicating the likelihood that the object identification is anomalous. It may output a probability metric indicating the probability that it is anomalous, etc.

Some examples may be helpful. Assume that the object has been identified as a ball, and object behavior analysis system 130 determines that it is rolling (or otherwise moving) downhill. In that case, the object identification is very likely not an anomaly, and the anomaly metric will indicate this. However, if the object has been identified by classifier 128 as a person, but object behavior analysis system 130 has determined that the object is moving 60 miles per hour, then the object identification is very likely anomalous, and the anomaly metric will indicate this. As another example, if classifier 128 has identified the object as an armadillo, but environmental sensor signals 122 (which may include a position signal) have indicated that mobile work machine 100 is in Minnesota, then the object identification is also very likely to be anomalous, and the anomaly metric will indicate this.

Action processing system 154 then determines whether the anomaly metric generated by generator 156 should give rise to some sort of action. This can be done by comparing the anomaly metric to a threshold value. The threshold can be static, in that it is the same for all identified objects under all conditions, or it can be dynamic. For instance, if the consequence of the expected vehicle response to the object identification is relatively severe, then it may take a lower anomaly likelihood to trigger an action. Similarly, there may be a library of identifiable objects, and each object may have its own anomaly metric threshold.

More specifically, in one example, the anomaly metric threshold may be chosen based upon the expected vehicle response to the identified object. For instance, if the object is identified as a plastic bag, then the expected vehicle response may by to not change operation, but instead to drive over the plastic bag. However, if the object has been misidentified (e.g., the actual object is a person holding a plastic bag), the consequences of the expected vehicle response may be catastrophic. Thus, where the consequences of the expected vehicle response are relatively severe, then the anomaly metric threshold may be chosen to be relatively low. These are just some examples of how the anomaly metric threshold can be chosen. Threshold identifier 162 identifies (or chooses) the threshold, and it can do so in any of these, or other ways.

Threshold comparison logic 164 compares the anomaly metric generated by generator 156 to the threshold chosen by threshold identifier 162 to determine whether it meets the threshold. If so, it outputs a trigger signal indicating that an action has been triggered. Action identifier 168 identifies the particular action to take and provides an indication of that to action signal generator 157. Action signal generator 157 generates an action signal based upon the particular action to be taken. For instance, it may be that an action to be taken is to invoke secondary object identification system 140. Whereas classifier 128 may be a neural network-based classifier, it may be that the secondary object identification system 140 is a rules-based object identifier. It thus uses a different algorithm or mechanism by which to identify the detected object through than object identification classifier 128. When it is invoked, it can provide an object identification output to object identification anomaly detection system 138 which, again, determines whether the behavior of the object would indicate that the object identification output by system 140 is anomalous. In another example, the object identification classifier 128 may return a ranked list of candidate object identifications. If the top ranked item in the list is determined to be anomalous, then the next item in the list may be selected and the anomaly analysis repeated. For example, an object may be first identified with confidence levels as armadillo 0.85, opossum 0.83, and tortoise 0.68 by object identification classifier 128. Location analyzer 134 indicates object is in Minnesota. Armadillos are out-of-range in Minnesota. Thus, the identification of the object is found to be anomalous. Action processing system 154 selects the next candidate in the list for vetting. Opossums are present in Minnesota. The action processing system 154 then takes action based on that object identification.

In yet another example, the first object identification system 128 can be a relatively small, less complex, but faster system. The secondary object identification system 140 can be a more powerful (even remote) system that has higher accuracy, but perhaps higher latency as well. In such a scenario, both systems 128 and 140 may be neural networks or rules-based systems or other systems, but have different levels of complexity and accuracy.

Further, in another example, systems 128 and 140 may be similar systems but operate on different data. For instance, the object may be partially obscured by vegetation when identified by system 128, but may be less obscured when identified by system 140. By way of analogy, and based on a real-life example, recently, the inventor's spouse thought she saw two mouse tails under the sink (the first object identification). The inventor was summoned for a second opinion. Motion analysis showed that the tails were not moving, and there did not seem to be space under the object from which they were protruding for a mouse to occupy. Thus, the first object identification was rejected based on behavior and environment data. Viewing the objects from a different angle, they appeared to be wider than a mouse tail so they were identified as blades of grass stuck to the bottom of a tall can (the second object identification). After removing the objects from under the sink to improve visibility, and probing the objects with a yard stick, the second object identification was also rejected, and the objects were identified as two ends of a broken rubber band that had been around the can (the third object identification).

In the same way, as the view of the object changes, or as new data about the object is obtained, the same object identification system 128, with the new data, may provide a subsequent object identification that is more accurate.

The action identified by action identifier 168 may be to control vehicle 100, automatically, in a certain way (such as to stop it), etc. In that case, action signal generator 157 provides an output indicative of this to control signal generator 142. Control signal generator 142 generates control signals to control one or more of the controllable subsystems 144 (or other items) in order to perform the identified action. For instance, it may be that machine 100 is to be controlled to stop quickly, or to steer around the object. In that case, control signal generator 142 generates control signals to control the propulsion system 172 to stop or slow down the vehicle, and/or the steering subsystem 174 to steer around the object. These are examples only.

It may be that the identified action is to surface information (an alert, or other information) to operator 112. In that case, action signal generator 157 provides an output indicative of this to operator interface mechanisms 146 so that they can generate the desired output. The action may also be to communicate information to a remote computing system 114, in which case action signal generator 178 generates an action signal indicative of this and provides it to communication system 148 so that the desired information can be communicated to remote computing system 114.

Figure 3A:
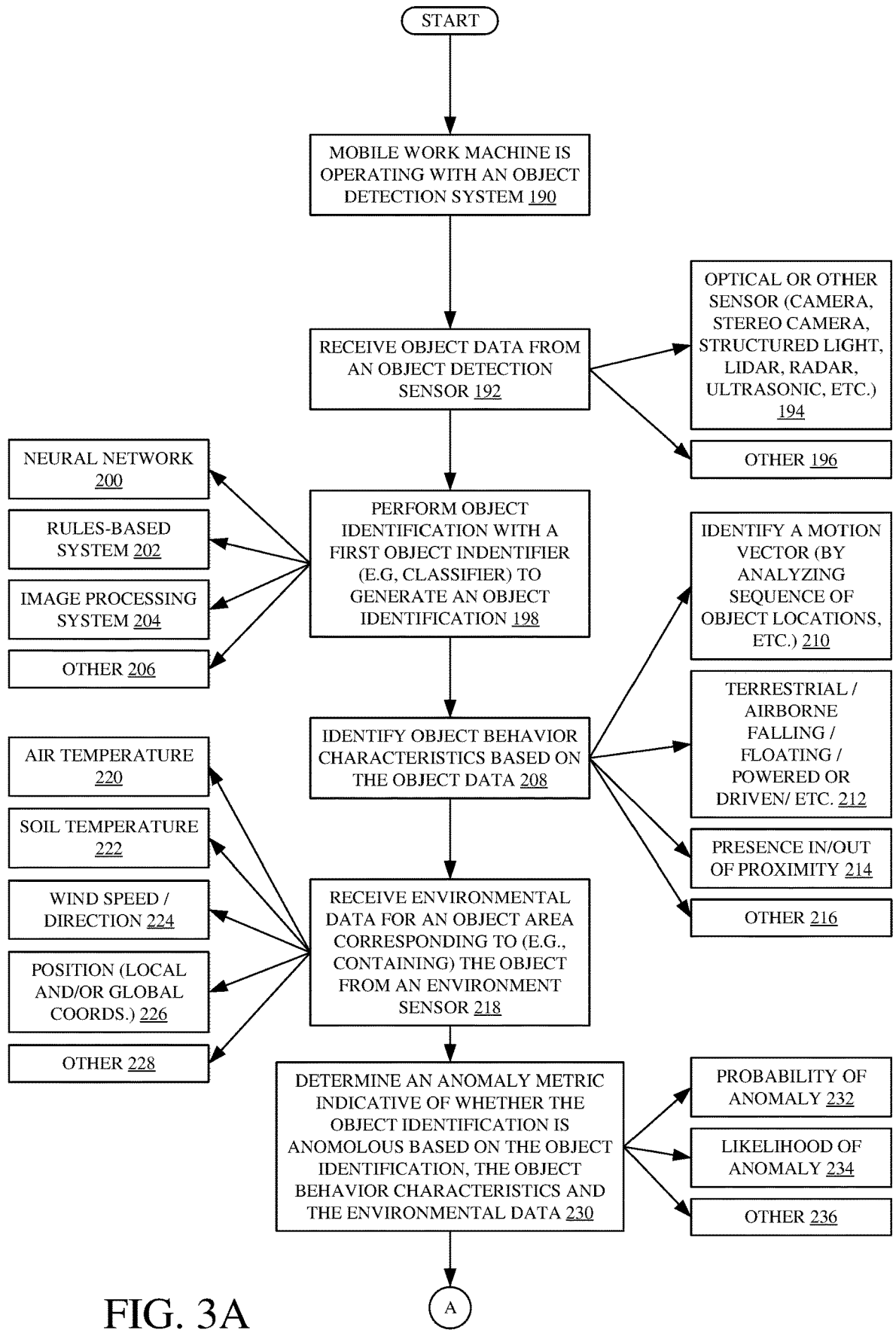
FIGS. 3A and 3B (collectively referred to herein as FIG. 3) show a flow diagram illustrating one example of the operation of the mobile work machine, shown in FIG. 2, in identifying an object and taking an action based upon the identified object.
Figure 3B:
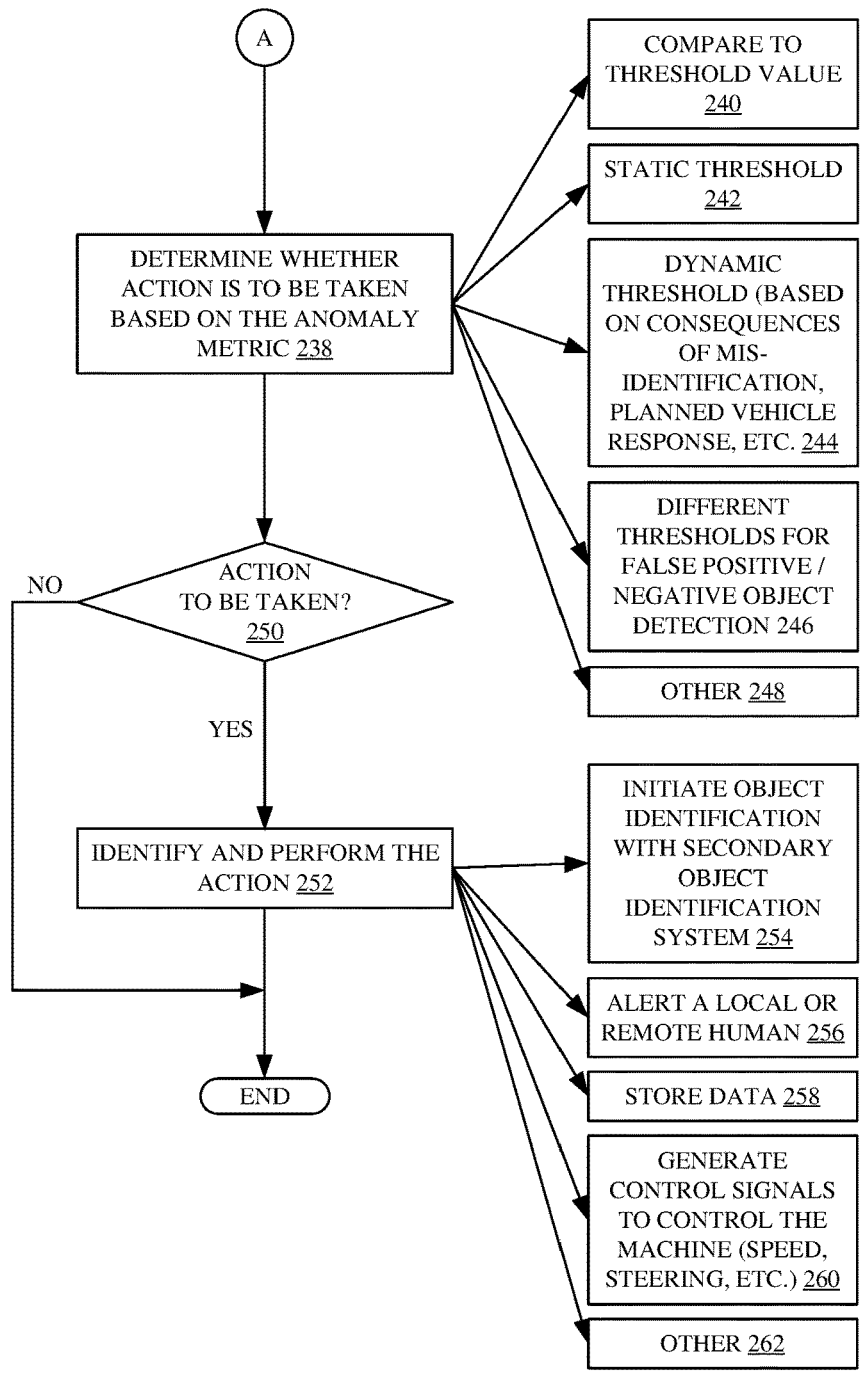

FIGS. 3A and 3B (collectively referred to herein as FIG. 3) illustrate a flow diagram showing one example of the operation of mobile work machine 100 in detecting an object, identifying it, determining whether the identification is anomalous, and taking appropriate action. It is first assumed that mobile work machine 100 is operating and has an object detection system such as that described with respect to FIG. 2. This is indicated by block 190 in the flow diagram of FIG. 3. Object detection sensors 120 then generate a sensor signal that includes object data, indicative of the detected object. Receiving object data from an object detection sensor 120 is indicted by block 192 in the flow diagram of FIG. 3. As discussed above, the sensors 120 can be optical or other sensors, such as one or more cameras, stereo cameras, structured light sensors, LIDAR, radar, ultrasonic sensors, etc. This is indicated by block 194. The object data can be generated in other ways, by other sensors as well, and this is indicated by block 196.

The sensor signals can be conditioned and provided to object identification classifier 128. Classifier 128 performs object identification based upon the object data in the sensor signals to generate an object identification that indicates the object that has been identified by classifier 128. This is indicated by block 198 in the flow diagram of FIG. 3. The object identification classifier 128 can be any of a wide variety of different classifiers. It can be a neural network 200, a rules-based system 202, an image processing system 204, or any of a wide variety of other classifiers 206.

Object behavior analysis system 130 then identifies object behavior characteristics, based upon the object data. This is indicated by block 208. Motion analyzer 132 can identify a motion vector by analyzing a sequence of object locations indicated by the object data, or otherwise. Identifying a motion vector is indicated by block 210.

Location analyzer 134 can analyze the location of the object, such as whether it is a terrestrial, air-based, falling, floating, powered or otherwise driven object, etc. This is indicated by block 212. Analyzer 134 can also determine whether the object is present within a given proximity of mobile work machine 100. This is indicated by block 214. The object behavior analysis system 130 can identify any of a wide variety of other behavior characteristics of the identified object. This is indicated by block 216 in the flow diagram of FIG. 3.

Environmental sensors 122 also generate environmental sensor signals indicative of environmental characteristics that are being sensed. The environmental data indicated by those sensor signals can be generated for a particular area around where the object has been identified or in other ways. Receiving environmental data for an object area corresponding to the object from environmental sensors 122, is indicated by block 218 in the flow diagram of FIG. 3. The environmental data can include such things as air temperature 220, soil temperature 222, wind speed and direction 224, position (within a local and/or global coordinate system) 226, and a wide variety of other environmental data as indicated by block 228.

Object identification anomaly detection system 138 then generates an anomaly metric indicative of whether the object identification is likely anomalous. This can be based on the object identification, the object behavior characteristics, and the environmental data. Determining the anomaly metric is indicated by block 230 in the flow diagram of FIG. 3. The metric is illustratively a measure of whether the object identification is anomalous. Therefore, it can be a probability of anomaly, as indicated by block 232, a likelihood of an anomaly, as indicated by block 234, or any of a wide variety of other measures, as indicated by block 236.

As discussed above, in order to generate the metric, object/behavior/environment analyzer 152 determines whether the object identification is consistent with the behavioral characteristics of the object, given its environment. An output indicative of this is provided to the anomaly metric generator 156 which generates the anomaly metric.

Action processing system 154 then determines whether any action is to be taken based upon the anomaly metric. This is indicated by block 238 in the flow diagram of FIG. 3. Action trigger detector 160 determines this, and it can do so based upon a comparison of the anomaly metric to an anomaly metric threshold value. This is indicated by block 240. As discussed above, the threshold value can be a static threshold as indicated by block 242, or it can be a dynamic threshold, as indicated by block 244. Where it is a dynamic threshold, it can be dynamically identified by threshold identifier 162 in a wide variety of different ways. The dynamic threshold can be identified based upon consequences of the expected vehicle response. It can be identified based on the degree to which the object identification appears anomalous. It can be identified based upon the particular object that has been identified, etc. Similarly, threshold identifier 162 can identify different thresholds based upon whether the object identification is likely to be a false positive or a false negative object identification. This is indicated by block 246 in the flow diagram of FIG. 3. Determining whether an action is to be taken can be done in a wide variety of other ways as well, and this is indicated by block 248.

If an action is to be taken, as indicated by block 250, then action identifier 168 identifies the particular action to be performed, and action signal generator 157 generates an action signal so that the action is performed by mobile work machine 100. Identifying and performing the action is indicated by block 252 in the flow diagram of FIG. 3. As discussed above, the action can be to initiate object identification with secondary object identification system 140. This is indicated by block 254. The action can be to control operator interface mechanisms 146 to generate an alert for a local operator 112, or to control communication system 148 to generate an alert or other information for remote user 116. This is indicated by block 256. The action can be to store data in data store 176 indicating the object that was identified, when and where it was identified, the anomaly metric, the basis for the anomaly metric, etc. Storing data is indicated by block 258. The action can also be to generate machine control signals to control mobile work machine 100. In that case, an output indicative of this is provided to control signal generator 142 which generates the control signals. For instance, it can be used to control the speed of mobile work machine 100 by controlling propulsion subsystem 172. It can be to control the steering of mobile work machine 100 by controlling steering subsystem 174. Generating control signals to control machine 100 is indicated by block 260 in the flow diagram of FIG. 3. A wide variety of other actions can be performed as well. This is indicated by block 262.

A number of different examples may be helpful. The actions to be taken can vary widely based upon the object identified. For instance, even if the object is identified as an animal, the action can vary widely based upon the type of animal identified. Ground squirrels, for example, run relatively quickly across the road. Therefore, the action may be to slow vehicle 100 to give the animal time to cross the road. As mentioned above, armadillos jump up into the vehicle. Therefore, the action may be to slow the vehicle, stop the vehicle, or to steer around the object. Opossums play dead. Therefore, the action may be to control the vehicle to drive over the possum, with no wheel contact. Adult deer often jump in front of a vehicle. Therefore, if there is one deer identified, machine 100 may be controlled in one way, such as to slow down or stop until the deer is clear, and then to proceed slowly even if it appears that the area around machine 100 is clear. If there are multiple deer, then the action may be based upon the location of those deer. If they are crossing the road, the action maybe to slow down or stop. If they are on the side of the road, and moving away from the road, then the action may be to slow slightly, but to continue forward. Similarly, young fawns tend to cower down and stay down. Therefore, the action may to drive over the young fawn, with no wheel contact. Also, it can be noted that young fawns may only be around at certain times of the year. This can be used in object identification anomaly detection system 138 to generate the anomaly metric. These are examples only.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Figure 4:
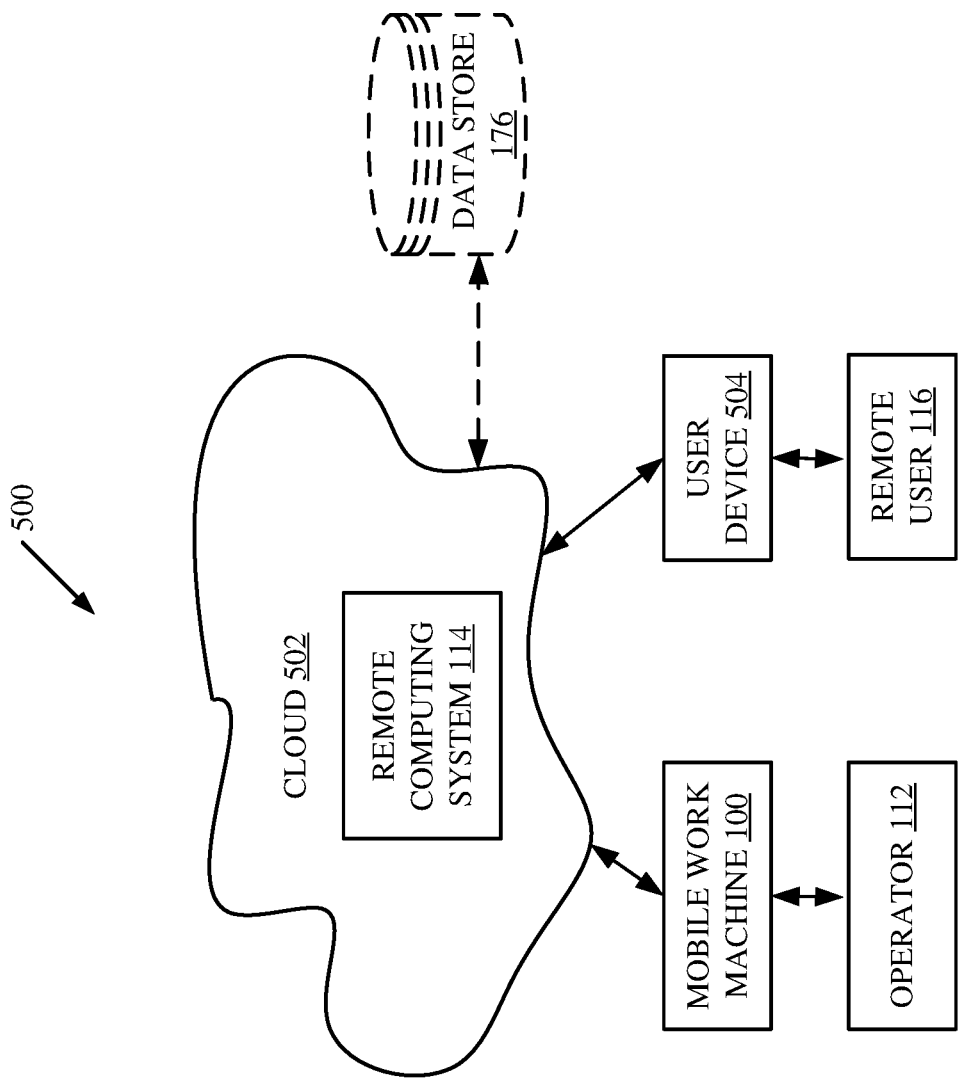
FIG. 4 is a block diagram showing one example of the mobile work machine illustrated in FIGS. 1 and 2, deployed in a remote server architecture.

FIG. 4 is a block diagram of machine 100, shown in FIGS. 1 and 2, except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 4, some items are similar to those shown in FIG. 2 and they are similarly numbered. FIG. 4 specifically shows that remote computing systems 114 and storage 176 can be located at a remote server location 502. Therefore, machine 100 accesses those systems through remote server location 502. Remote user 116 can use device 504 to access those systems.

Regardless of where they are located, they can be accessed directly by machine 100, through a network (either a wide area network or a local area network), they can be hosted at a remote site by a service, or they can be provided as a service, or accessed by a connection service that resides in a remote location. All of these architectures are contemplated herein.

It will also be noted that the elements of FIGS. 1 and 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
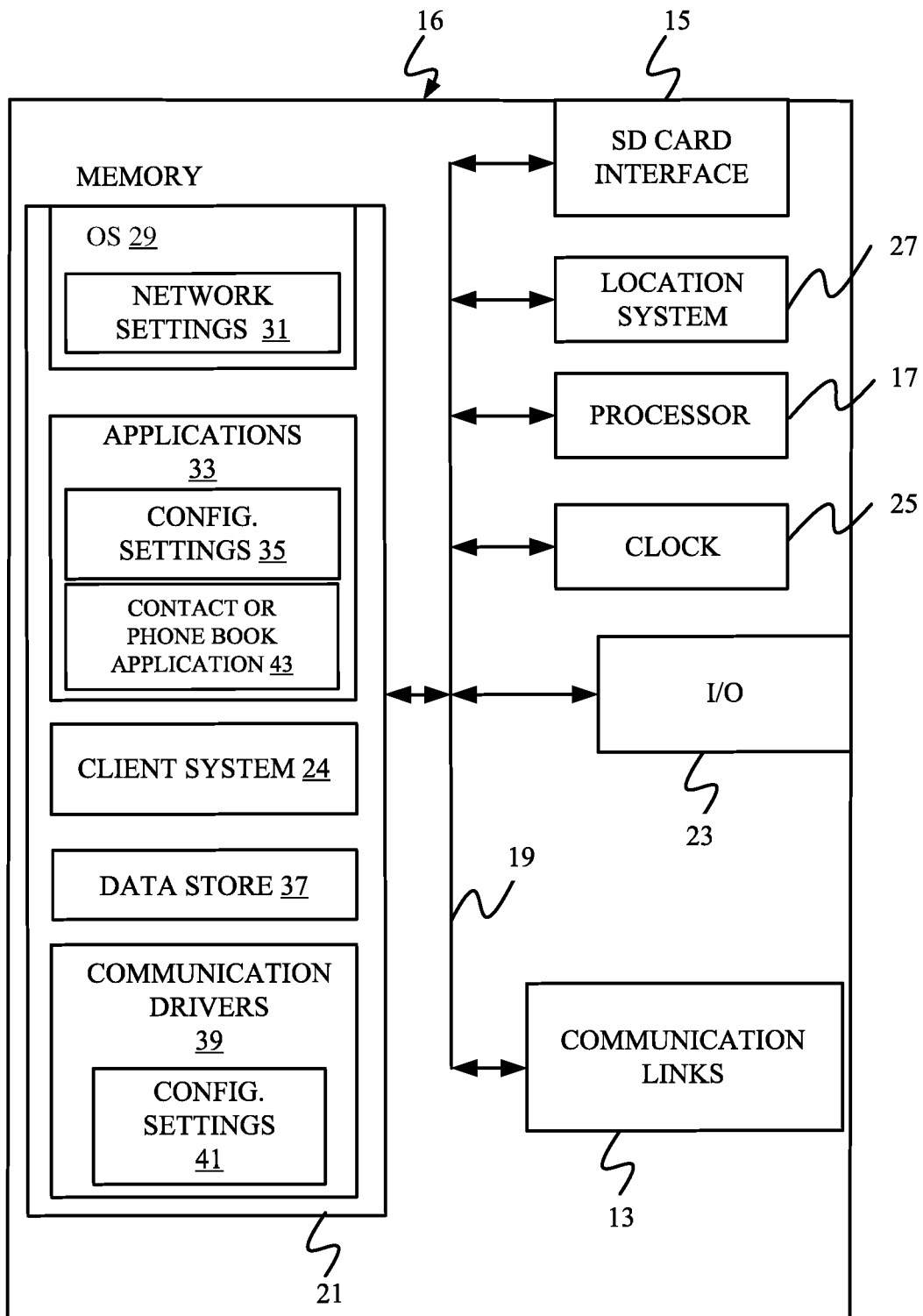
FIGS. 5-7 show examples of mobile devices that can be used in the architectures shown in the previous figures.
Figure 6:
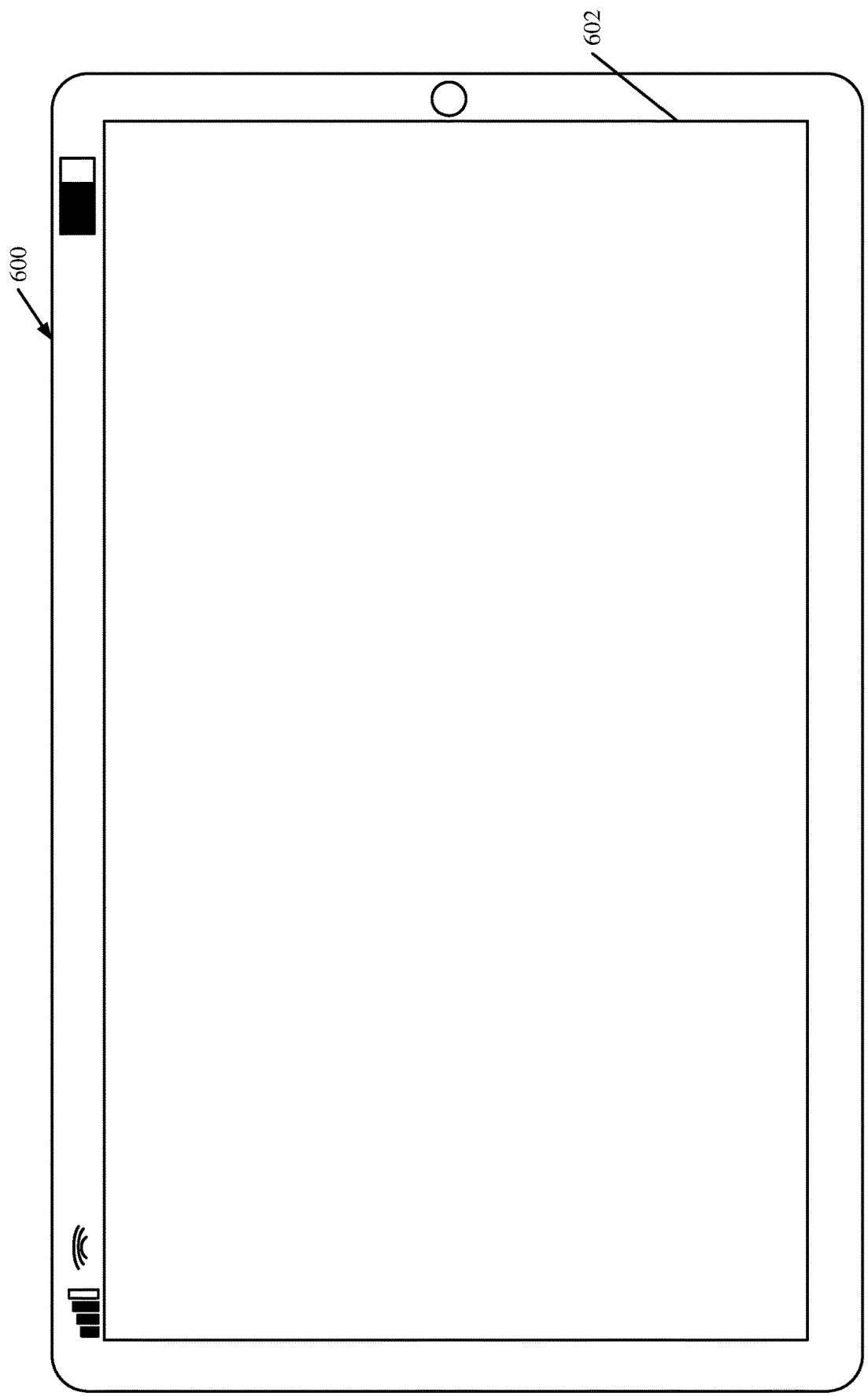
Figure 7:
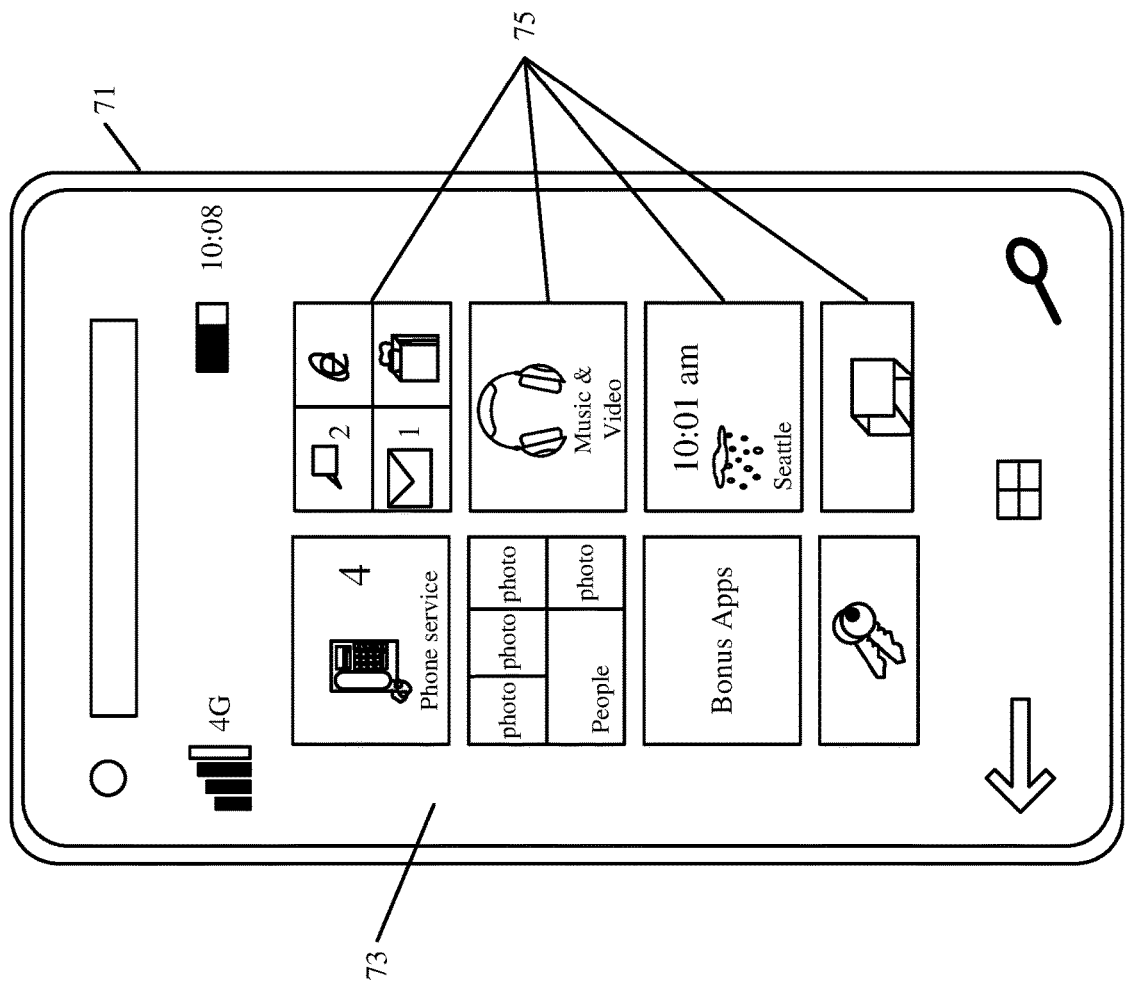

FIG. 5 is a simplified block diagram of one illustrative example of a handheld or mobile computing device that can be used as a user's or client's hand held device 16, in which the present system (or parts of it) can be deployed. For instance, a mobile device can be deployed in the operator compartment of machine 100 for use in generating, processing, or displaying the information discussed above. FIGS. 6-7 are examples of handheld or mobile devices.

FIG. 5 provides a general block diagram of the components of a client device 16 that can run some components shown in FIG. 2, that interacts with them, or both. In the device 16, a communications link 13 is provided that allows the handheld device to communicate with other computing devices and in some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 6 shows one example in which device 16 is a tablet computer 600. In FIG. 6, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 7 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 8:
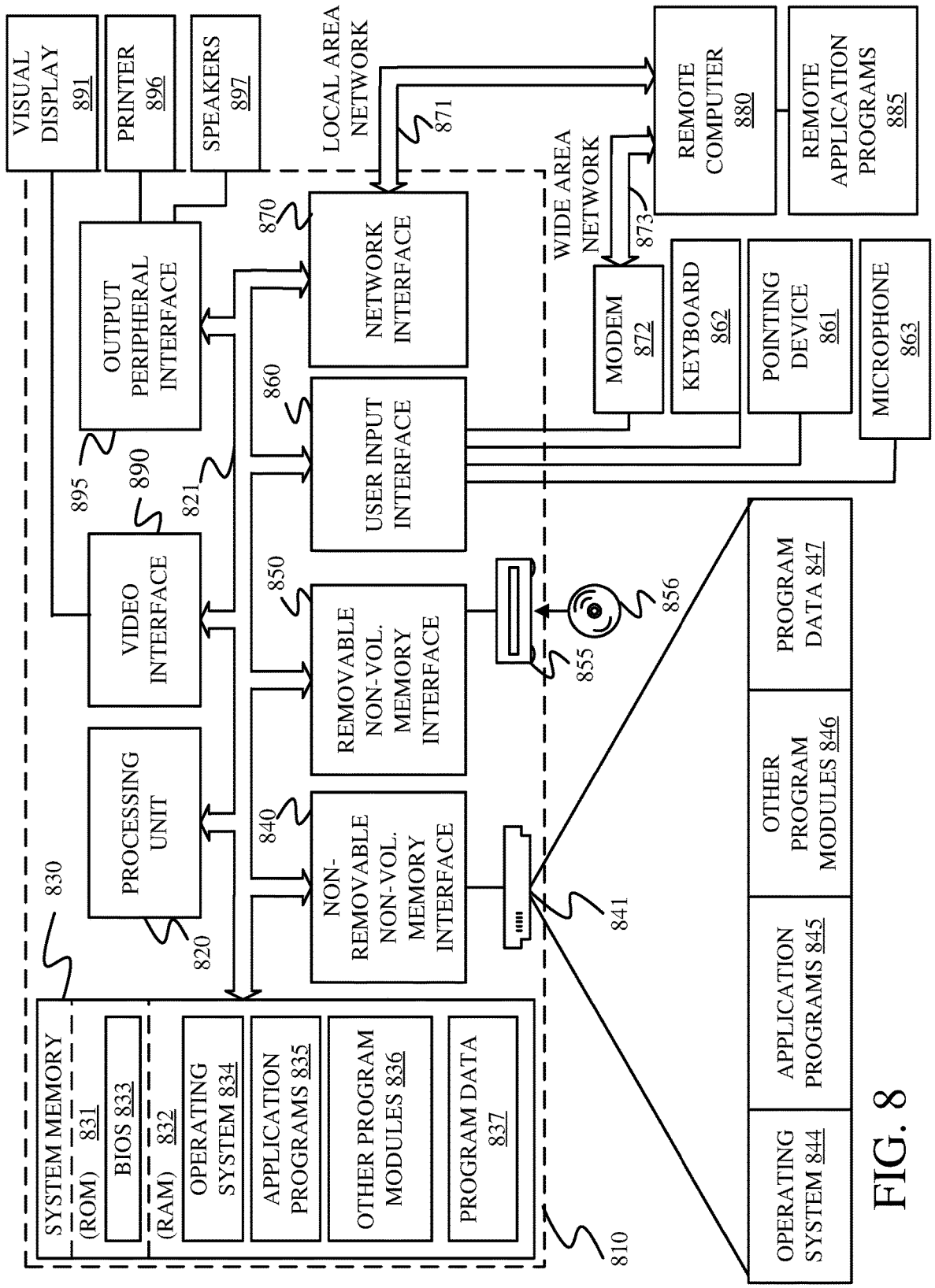
FIG. 8 is a block diagram showing one example of a computing environment that can be used in the architectures shown in the previous figures.

FIG. 8 is one example of a computing environment in which elements of FIG. 2, or parts of it, (for example) can be deployed. With reference to FIG. 8, an exemplary system for implementing some embodiments includes a computing device in the form of a computer 810 programmed to perform as discussed above. Components of computer 810 may include, but are not limited to, a processing unit 820 (which can comprise processor 108), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 2 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 8 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Example 1 is a mobile work machine, comprising:

a first object identification system that receives object data indicative of an object detected by an object detection sensor, and generates a first object identification, indicative of the object, based on the object data;

an object behavior analysis system that generates a set of object behavior characteristics, indicative of a behavior of the object, based on the object data;

an object identification anomaly detection system that receives the object data, and object anomaly data and generates an anomaly metric indicative of whether the first object identification is anomalous, based on the first object identification, and the object anomaly data;

a secondary object identification system, that identifies objects differently from the first object identification system, and that receives the object data and generates a second object identification, indicative of the object, based on the object data; and an action signal generator that generates an action signal to invoke the second object identification system based on the anomaly metric.

Example 2 is the mobile work machine of any or all previous examples wherein the object anomaly data comprises at least one of the set of behavior characteristics or environment data, indicative of a sensed environmental characteristic.

Example 3 is the mobile work machine of any or all previous examples and further comprising:

a controllable subsystem, wherein the action signal generator generates the action signal to control the controllable subsystem based on the first object identification and the anomaly metric.

Example 4 is the mobile work machine of any or all previous examples wherein the object identification anomaly detection system comprises:

an object/behavior/environment analyzer that determines whether the behavioral characteristics are inconsistent with the first object identification, given the sensed environmental characteristic and generates a behavioral analysis result indicative of the determination.

Example 5 is the mobile work machine of any or all previous examples wherein the object identification anomaly detection system comprises:

an anomaly metric generator configured to generate the anomaly metric based on the behavioral analysis result.

Example 6 is the mobile work machine of any or all previous examples wherein the object identification anomaly detection system comprises:

an action processing system that determines whether an action is to be taken based on the anomaly metric.

Example 7 is the mobile work machine of any or all previous examples wherein the action processing system comprises:

threshold comparison logic configured to compare the anomaly metric to an anomaly threshold to determine whether an action is to be taken; and an action identifier configured to identify the action to be taken when the threshold comparison logic determines that an action is to be taken.

Example 8 is the mobile work machine of any or all previous examples wherein the action processing system further comprises:

a threshold identifier configured to identify the anomaly threshold.

Example 9 is the mobile work machine of any or all previous examples wherein the first object identification has a corresponding expected machine response and wherein the threshold identifier identifies the anomaly threshold based on the expected machine response corresponding to the first object identification.

Example 10 the mobile work machine of any or all previous examples wherein the object behavior analysis system comprises:

a motion analyzer configured to identify motion characteristics of the identified object based on the object data.

Example 11 the mobile work machine of any or all previous examples wherein the object behavior analysis system comprises:

a location analyzer configured to identify location characteristics of the identified object based on the object data.

Example 12 is the mobile work machine of any or all previous examples wherein one of the first object identification system and the second object identification system comprises a neural network-based classifier and wherein another of the first object identification system and the second object identification system comprises a rules-based classifier.

Example 13 a computer implemented method of controlling a mobile work machine, comprising:

receiving object data indicative of an object detected by an object detection sensor;

generating a first object identification, indicative of the object, based on the object data, using a first object identification system;

obtaining object anomaly data indicative of whether the first object identification is anomalous;

generating an anomaly metric indicative of whether the first object identification is anomalous, based on the first object identification, and the object anomaly data; and if the anomaly metric indicates that the first object identification is anomalous, then generating a second object identification, indicative of the object, based on the object data, using a second object identification system that identifies objects differently from the first object identification system.

Example 14 the computer implemented method of any or all previous examples wherein obtaining object anomaly data comprises at least one of:

generating a set of object behavior characteristics, indicative of a behavior of the object, based on the object data; or receiving environment data, indicative of a sensed environmental characteristic.

Example 15 the computer implemented method of any or all previous examples wherein the mobile work machine includes a controllable subsystem, and further comprising:

generating an action signal to control the controllable subsystem based one of the first object identification and the second object identification.

Example 16 is the computer implemented method of any or all previous examples wherein generating an anomaly metric comprises:

determining whether the behavioral characteristics are inconsistent with the first object identification, given the sensed environmental characteristic;

generating a behavioral analysis result indicative of the determination; and generating the anomaly metric based on the behavioral analysis result.

Example 17 is the computer implemented method of any or all previous examples wherein generating the second object identification comprises:

comparing the anomaly metric to an anomaly threshold to determine whether the second object identification is to be generated; and if so, controlling the second object identification system to generate the second object identification.

Example 18 is the computer implemented method of any or all previous examples wherein the first object identification has a corresponding expected machine response and wherein comparing the anomaly metric to an anomaly threshold comprises:

identifying the anomaly threshold based on the expected machine response corresponding to the first object identification.

Example 19 is the computer implemented method of any or all previous examples wherein generating a set of behavior characteristics comprises at least one of:

identifying motion characteristics of the identified object based on the object data; and identifying location characteristics of the identified object based on the object data.

Example 20 is a control system for controlling a mobile work machine, the control system comprising:

one or more processors; and memory that stores instructions which, when executed by the one or more processors, cause the one or more processors to perform steps comprising:

generating a first object identification, indicative of an object, based on object data provided by an object detection sensor, using a first object identification system;

generating a set of object behavior characteristics, indicative of a behavior of the object, based on the object data;

generating an anomaly metric indicative of whether the first object identification is anomalous, based on the first object identification, the set of behavioral characteristics and environment data, indicative of a sensed environmental characteristic; and if the anomaly metric indicates that the first object identification is anomalous, then generating a second object identification, indicative of the object, based on the object data, using a second object identification system that identifies objects using an object identification algorithm that is different from an object identification algorithm used by the first object identification system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile work machine comprising:
a first object identification system that receives object data indicative of an object detected by an object detection sensor, and generates a first object identification, indicative of the object, based on the object data;
an object behavior analysis system that generates a set of object behavior characteristics, indicative of a behavior of the object, based on the object data;
an object identification anomaly detection system that receives the object data, and object anomaly data comprising at least one of the set of behavior characteristics, and generates an anomaly metric indicative of whether the first object identification is anomalous using the first object identification and the object anomaly data;
a secondary object identification system, that identifies objects differently from the first object identification system, and that receives the object data and generates a second object identification, indicative of the object, based on the object data; and
an action signal generator that generates an action signal to invoke the second object identification system based on the anomaly metric.

2. The mobile work machine of claim 1, wherein the object anomaly data further comprises environment data, indicative of a sensed environmental characteristic.

3. The mobile work machine of claim 2 and further comprising:
a controllable subsystem, wherein the action signal generator generates and additional action signal to control the controllable subsystem based on the second object identification.

4. The mobile work machine of claim 2, wherein the object identification anomaly detection system comprises:
an object/behavior/environment analyzer that determines whether the behavioral characteristics are inconsistent with the first object identification, given the sensed environmental characteristic and generates a behavioral analysis result indicative of the determination.

5. The mobile work machine of claim 4, wherein the object identification anomaly detection system comprises;
an anomaly metric generator configured to generate the anomaly metric based on the behavioral analysis result.

6. The mobile work machine of claim 5, wherein the object identification anomaly detection system comprises:
an action processing system that determines whether an action is to be taken based on the anomaly metric.

7. The mobile work machine of claim 6, wherein the action processing system comprises:
threshold comparison logic configured to compare the anomaly metric to an anomaly threshold to determine whether an action is to be taken; and
an action identifier configured to identify the action to be taken when the threshold comparison logic determines that an action is to be taken.

8. The mobile work machine of claim 7, wherein the action processing system further comprises:

a threshold identifier configured to identify the anomaly threshold.

9. The mobile work machine of claim 8, wherein the first object identification has a corresponding expected machine response and wherein the threshold identifier identifies the anomaly threshold based on the expected machine response corresponding to the first object identification.

10. The mobile work machine of claim 2, wherein the object behavior analysis system comprises:
a motion analyzer configured to identify motion characteristics of the identified object based on the object data.

11. The mobile work machine of claim 2, wherein the object behavior analysis system comprises:
a location analyzer configured to identify location characteristics of the identified object based on the object data.

12. The mobile work machine of claim 2, wherein one of the first object identification system and the second object identification system comprises a neural network-based classifier and wherein another of the first object identification system and the second object identification system comprises a rules-based classifier.

13. A computer implemented method of controlling a mobile work machine, the method comprising:
receiving object data indicative of an object detected by an object detection sensor;
generating a first object identification, indicative of the object, based on the object data, using a first object identification system;
obtaining object anomaly data indicative of whether the first object identification is anomalous, the object anomaly data including, a set of object behavior characteristics, indicative of the behavior of the object, based on the object data;
generating an anomaly metric indicative of whether the first object identification is anomalous using the first object identification and the object anomaly data;
determining that the first object identification is anomalous based on the anomaly metric; and
generating, based on the determination that the first object identification is anomalous, a second object identification, indicative of the object, based on the object data, using a second object identification system that identifies objects differently from the first object identification system.

14. The computer implemented method of claim 13, wherein obtaining object anomaly data further comprises:
receiving environment data, indicative of a sensed environmental characteristic.

15. The computer implemented method of claim 14, wherein the mobile work machine includes a controllable subsystem, and further comprising:
generating an action signal to control the controllable subsystem based on one of the first object identification and the second object identification.

16. The computer implemented method of claim 15 wherein generating an anomaly metric comprises:
determining whether the behavioral characteristics are inconsistent with the first object identification, given the sensed environmental characteristic;
generating a behavioral analysis result indicative of the determination; and
generating the anomaly metric based on the behavioral analysis result.

17. The computer implemented method of claim 16, wherein generating the second object identification comprises:
 comparing the anomaly metric to an anomaly threshold to determine whether the second object identification is to be generated;
 determining that the second object identification is to be generated based on the comparison
 controlling the second object identification system to generate the second object identification based on the determination.

18. The computer implemented method of claim 17, wherein the first object identification has a corresponding, expected machine response and wherein comparing the anomaly metric to an anomaly threshold comprises:
 identifying the anomaly threshold based on the expected machine response corresponding to the first object identification.

19. The computer implemented method of claim 18 and further comprising generating the set of behavior characteristics, wherein generating a set of behavior characteristics comprises at least one of:
 identifying motion characteristics of the identified object based on the object data; and
 identifying location characteristics of the identified object based on the object data.

20. A control system for controlling a mobile work machine, the control system comprising:
 one or more processors; and
 memory that stores instructions which, when executed by the one or more processors, cause the one or more processors to perform steps comprising:
  generating a first object identification, indicative of an object, based on object data provided by an object detection sensor, using a first object identification system;
  generating a set of object behavior characteristics, indicative of a behavior of the object, based on the object data;
  generating an anomaly metric indicative of whether the first object identification is anomalous using the first object identification, the set of behavioral characteristics, and environment data indicative of a sensed environmental characteristic; and
 generating, when the anomaly metric indicates that the first object identification is anomalous, a second object identification, indicative of the object, based on the object data, using a second object identification system that identifies objects using an object identification algorithm that is different from an object identification algorithm used by the first object identification system.

21. The control system of claim 20, wherein the sensed environmental characteristic comprises a sensed weather characteristic.

* * * * *